United States Patent
Jung et al.

(10) Patent No.: US 9,083,810 B2
(45) Date of Patent: Jul. 14, 2015

(54) APPARATUS AND METHOD FOR MOTION DETECTING IN MOBILE COMMUNICATION TERMINAL

(75) Inventors: Woo-Jin Jung, Seongnam-si (KR); Hyun-Su Hong, Seongnam-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 229 days.

(21) Appl. No.: 13/011,105

(22) Filed: Jan. 21, 2011

(65) Prior Publication Data
US 2011/0183706 A1  Jul. 28, 2011

(30) Foreign Application Priority Data
Jan. 22, 2010  (KR) .................. 10-2010-0005845

(51) Int. Cl.
*H04M 1/00* (2006.01)
*H04M 1/725* (2006.01)

(52) U.S. Cl.
CPC ........ *H04M 1/72522* (2013.01); *H04M 1/7253* (2013.01); *H04M 1/72544* (2013.01); *H04M 2250/12* (2013.01); *H04M 2250/64* (2013.01)

(58) Field of Classification Search
CPC .......... H04M 1/72522; H04M 1/7253; H04M 2250/12; H04M 2250/64; H04M 1/72544
USPC ............................ 455/550.1, 41.2, 41.3, 41.1, 455/556.1–556.2, 456.1–457, 517
See application file for complete search history.

(56) References Cited

U.S. PATENT DOCUMENTS

| | | | | |
|---|---|---|---|---|
| 6,487,421 | B2* | 11/2002 | Hess et al. | 455/550.1 |
| 7,724,705 | B2* | 5/2010 | Erola et al. | 370/331 |
| 8,219,028 | B1* | 7/2012 | Flamholz | 455/41.2 |
| 8,478,290 | B2* | 7/2013 | Yoeli | 455/456.1 |
| 8,560,004 | B1* | 10/2013 | Tsvetkov et al. | 455/550.1 |
| 8,812,058 | B2* | 8/2014 | Lee et al. | 455/566 |
| 8,929,949 | B2* | 1/2015 | Liu et al. | 455/556.1 |
| 2005/0164633 | A1* | 7/2005 | Linjama et al. | 455/41.2 |
| 2005/0212749 | A1* | 9/2005 | Marvit et al. | 345/156 |
| 2005/0216867 | A1* | 9/2005 | Marvit et al. | 715/863 |
| 2006/0256074 | A1* | 11/2006 | Krum et al. | 345/156 |
| 2007/0177803 | A1* | 8/2007 | Elias et al. | 382/188 |

(Continued)

FOREIGN PATENT DOCUMENTS

| | | |
|---|---|---|
| CN | 101620237 | 1/2010 |
| JP | 2007-329599 | 12/2007 |

(Continued)

OTHER PUBLICATIONS

International Search Report dated Sep. 30, 2011 in connection with PCT Patent Application No. PCT/KR2011/000429.

(Continued)

*Primary Examiner* — Sharad Rampuria

(57) ABSTRACT

An apparatus and a method detect a motion in a mobile station. A motion is determined via a motion detecting function in the mobile station. A parameter for motion detection is determined from sensor data obtained via a sensor. The extracted parameter for the motion detection is transmitted to a counterpart mobile station. A parameter for motion detection determined by the counterpart mobile station is received from the counterpart mobile station. The extracted parameter is compared with the parameter received from the counterpart mobile station to determine a function associated with a motion input by a user.

20 Claims, 4 Drawing Sheets

(56) References Cited

U.S. PATENT DOCUMENTS

| | | | |
|---|---|---|---|
| 2007/0188323 A1 | 8/2007 | Sinclair et al. | |
| 2008/0195735 A1* | 8/2008 | Hodges et al. | 709/227 |
| 2009/0027338 A1* | 1/2009 | Weinberg et al. | 345/158 |
| 2009/0153342 A1* | 6/2009 | Thorn | 340/669 |
| 2010/0167646 A1* | 7/2010 | Alameh et al. | 455/41.2 |
| 2011/0053641 A1* | 3/2011 | Lee et al. | 455/556.1 |
| 2011/0070826 A1* | 3/2011 | Griffin et al. | 455/41.1 |
| 2011/0258689 A1* | 10/2011 | Cohen et al. | 726/7 |
| 2012/0032877 A1* | 2/2012 | Watkins, Jr. et al. | 345/156 |
| 2012/0154293 A1* | 6/2012 | Hinckley et al. | 345/173 |
| 2013/0040560 A1* | 2/2013 | Kennedy et al. | 455/41.1 |
| 2014/0364056 A1* | 12/2014 | Belk et al. | 455/41.1 |

FOREIGN PATENT DOCUMENTS

| | | |
|---|---|---|
| JP | 2009-188764 | 8/2009 |
| KR | 10-0646347 B1 | 11/2006 |
| KR | 10-2007-0040994 | 4/2007 |
| KR | 10-2007-0047946 | 5/2007 |
| WO | WO 2009/031899 A1 | 3/2009 |

OTHER PUBLICATIONS

Written Opinion of International Searching Authority dated Sep. 30, 2011 in connecton with PCT Patent Application No. PCT/KR2011/000429.

Chinese Office Action dated Dec. 3, 2013 in connection with Chinese Patent Application No. 201180006649.9, 22 pages.

Notice of Preliminary Rejection dated Aug. 22, 2013 in connection with Japanese Patent Application No. 2012-548901, 7 pages.

Extended European Search Report dated May 2, 2014 in connection with European Patent Application No. 11734887.0, 7 pages.

Decision of Rejection dated Jul. 1, 2014 in connection with Japanese Patent Application No. 2012-548901, 5 pages.

Second Chinese Office Action dated Aug. 15, 2014 in connection with Chinese Patent Application No. 201180006649.9, 30 pages.

Notice of Patent Grant dated Jan. 26, 2015 in connection with Japanese Patent Application No. 2012-548901; 5 pages.

European Office Action dated Apr. 21, 2015 in connection with European Patent Application No. 11734887.0; 5 pages.

\* cited by examiner

| TERMINAL ID | MOTION ID | TIME POINT AT WHICH MOTION OCCURS | TIME DURING WHICH MOTION IS MAINTAINED | MOTION INTENSITY | MOTION DIRECTION | ... |
|---|---|---|---|---|---|---|
| 300 | 302 | 304 | 306 | 308 | 310 | |

FIG.3

APPARATUS AND METHOD FOR MOTION DETECTING IN MOBILE COMMUNICATION TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jan. 22, 2010 and assigned Serial No. 10-2010-0005845, the entire disclosure of which is hereby incorporated by reference.

TECHNICAL FIELD OF THE INVENTION

The present invention relates to an apparatus and a method for detecting a motion in a mobile communication terminal. More particularly, the present invention relates to an apparatus and a method for determining a motion through a motion detecting function in two or more mobile communication terminals. In the present disclosure, a mobile communication terminal is also referred to as a mobile station.

BACKGROUND OF THE INVENTION

A mobile station that includes a motion detecting function detects a motion input by a user via a sensor, and performs a predetermined function for the detected motion. Accordingly, the user may allow the mobile station to perform a desired function by inputting a motion to the mobile station itself even without manually pressing a key button provided on the mobile station. Such a motion detecting function may be utilized for games or applications.

A mobile station that includes a motion detecting function extracts (determines) a parameter for motion detection from sensor data obtained via a sensor of itself, and compares the extracted (determined) parameter with a reference value of a parameter to detect a specific motion input by a user.

To allow a mobile station to perform a predetermined function by inputting a motion to the mobile station that includes a motion detecting function, a user needs to input an accurate motion to the mobile station. That is, the user has to input a motion to meet a parameter reference value for a specific motion. However, it is not easy that the user inputs a motion to meet a parameter reference value for a specific motion. Accordingly, the mobile station may not perform a relevant function or perform a false function.

For example, a file transfer function may be defined by allowing two mobile stations to bump against each other and giving an impact. That is, when an impact motion is input while a mobile station moves (referred to as a 'tipping motion' hereinafter), the relevant mobile station may recognize the input motion as a motion for file transfer, and when an impact motion is input while a mobile station does not move (referred to as a 'tapping motion' hereinafter), the relevant mobile station may recognize the input motion as a motion for file reception, such that transmission/reception of a file between the two mobile stations may be performed. In this situation, when movement is small, a tipping motion is not properly detected, and the mobile station may not recognize that the motion for file transfer has been input. In addition, when movement is given to both the two mobile stations while a user inputs an impact motion, a tapping motion is not properly detected, and the mobile station may not recognize the motion for file reception has been input. In this situation, the mobile stations cannot transmit/receive the file accordingly.

Additionally, the conventional motion detecting function does not consider a plurality of users. Therefore, there is a limitation in using the motion detection function in games or applications for a plurality of users. This limitation is contradictory to a recent trend to applications for a plurality of users.

SUMMARY OF THE INVENTION

To address the above-discussed deficiencies of the prior art, it is a primary object to provide at least the advantages described below. Accordingly, an aspect of the present invention is to provide an apparatus and a method for detecting a motion in a mobile station.

Another aspect of the present invention is to provide an apparatus and a method for determining a motion via a motion detecting function in two or more mobile stations.

Still another aspect of the present invention is to provide an apparatus and a method for determining a motion by sharing a parameter for motion detection in two or more mobile stations that include a motion detecting function.

Yet another aspect of the present invention is to provide a motion detecting function that considers a plurality of users in a mobile station.

In accordance with an aspect of the present invention, a method for determining a motion via a motion detecting function in a mobile station is provided. The method includes extracting (determining) a parameter for motion detection from sensor data obtained via a sensor. The extracted (determined) parameter for the motion detection is transmitted to a counterpart mobile station. A parameter for motion detection extracted (determined) by the counterpart mobile station is received from the counterpart mobile station. And the extracted (determined) parameter is compared with the parameter received from the counterpart mobile station to determine a function associated with a motion input by a user.

In accordance with another aspect of the present invention, an apparatus for determining a motion via a motion detecting function in a mobile station is provided. The apparatus includes a motion detector for extracting (determining) a parameter for motion detection from sensor data obtained via a sensor and comparing the extracted (determined) parameter with a parameter received from a counterpart mobile station to determine a function associated with a motion input by a user. A data transmitter transmits the extracted (determined) parameter for motion detection to the counterpart mobile station. And a data receiver receives the parameter for motion detection extracted (determined) by the counterpart mobile station.

The present invention has advantages of reducing a situation in which a mobile station cannot perform a relevant function or perform a false function, and thus remarkably increasing a motion detect success rate by allowing two or more mobile stations that include a motion detecting function to share parameters for motion detection and determine a motion. In addition, the present invention has an advantage of using a motion detecting function in games or applications for a plurality of users by providing a motion detecting function that considers a plurality of users.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages and salient features of the invention will become apparent to those skilled in the art from the following detailed description, which, taken in conjunction with the annexed drawings, discloses embodiments of the invention.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates a data format shared for motion determination in two mobile stations that include a motion detecting function according to an embodiment of the present invention.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication device. The following description with reference to the accompanying drawings is provided to assist in a comprehensive understanding of embodiments of the invention as defined by the claims and their equivalents. It includes various specific details to assist in that understanding but these are to be regarded as merely illustrative and not intended to limit the scope of the present disclosure. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Embodiments of the present invention provide an alternative for determining a motion via a motion detecting function in two or more mobile stations. More particularly, embodiments of the present invention provide an alternative for determining a motion by sharing parameters for motion detection among two or more mobile stations that include a motion detecting function. For convenience in description, the following description is made using two mobile stations that include a motion detecting function as an example.

Figure 1:
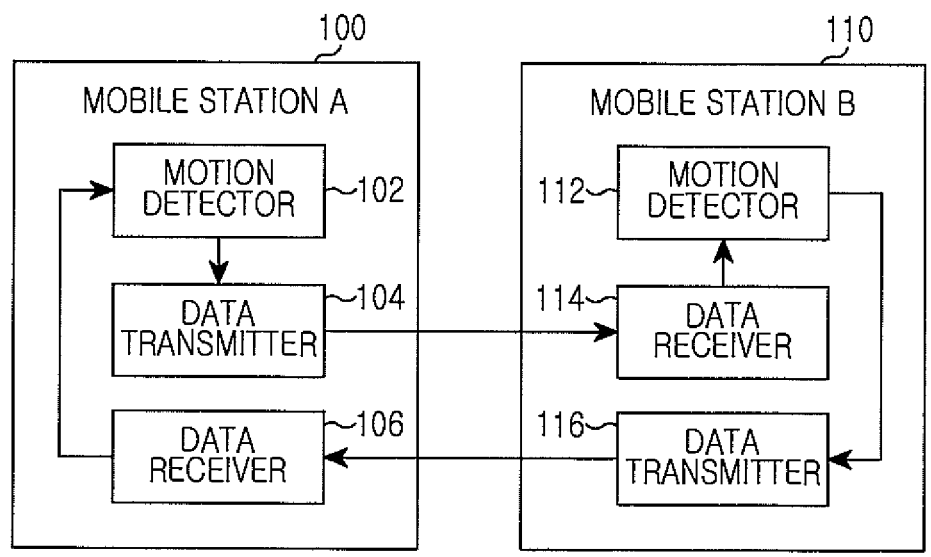
FIG. 1 is a block diagram illustrating apparatuses of two mobile stations that include a motion detecting function according to an embodiment of the present invention.

FIG. 1 is a block diagram illustrating apparatuses of two mobile stations that include a motion detecting function according to an embodiment of the present invention.

As illustrated, each of a mobile station A 100 and a mobile station B 110 that include a motion detecting function includes a motion detector 102(112), a data transmitter 104 (116), and a data receiver 106(114).

Referring to FIG. 1, the motion detector 102(112) senses a motion input by a user via a sensor (for example, an acceleration sensor) to obtain sensor data, and drives a motion detecting algorithm based on the obtained sensor data to determine the motion input by the user. Here, examples of the motion detecting algorithm include an impact detecting algorithm, a shake detecting algorithm, a snap detecting algorithm, and such. More particularly, the motion detector 102 (112) extracts (determines) a parameter for motion detection from the obtained sensor data to transmit the same to a counterpart mobile station via the data transmitter 104(116), and receives a parameter for motion detection extracted (determined) by the counterpart mobile station from the counterpart mobile station via the data receiver 106(114). In addition, the motion detector 102(112) compares parameters shared with the counterpart mobile station through the transmission/reception, that is, compares the parameter extracted (determined) by the mobile station itself and the parameter extracted by the counterpart mobile station to determine the motion input by the user.

The data transmitter 104(116) transmits a parameter for motion detection input from the motion detector 102(112) to the counterpart mobile station. Here, the data transmitter 104(116) may perform communication with the counterpart mobile station using Bluetooth communication, a wireless Local Area Network (LAN) communication, a WIFI communication, an infrared ray communication, an Ultra WideBand (UWB) communication, and such.

The data receiver 106(114) receives a parameter for motion detection extracted by the counterpart mobile station from the counterpart mobile station to provide the extracted parameter to the motion detector 102(112). Here, the data receiver 106 (114) may perform communication with the counterpart mobile station using Bluetooth communication, a wireless Local Area Network (LAN) communication, a WIFI communication, an infrared ray communication, an Ultra WideBand (UWB) communication, and such.

Figure 2:
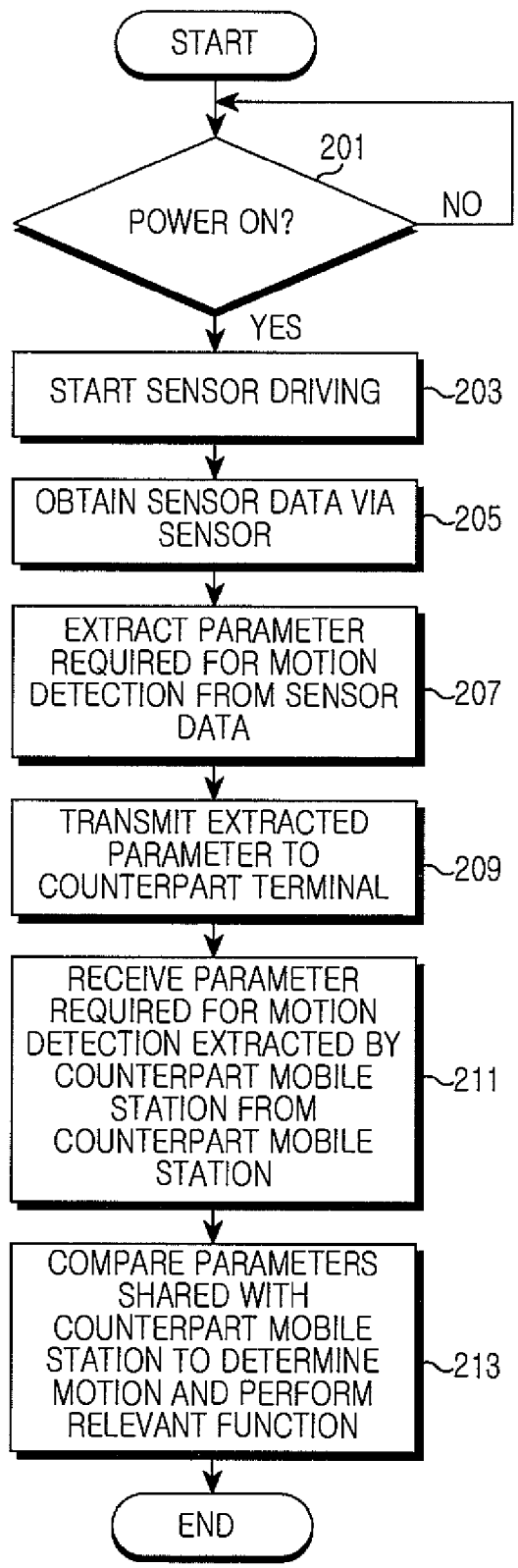
FIG. 2 illustrates a process for determining a motion via a motion detecting function in two mobile stations that include a motion detecting function according to an embodiment of the present invention.

FIG. 2 illustrates a process for determining a motion via a motion detecting function in two mobile stations that include a motion detecting function according to an embodiment of the present invention.

Referring to FIG. 2, a mobile station determines whether power is turned-on in block 201.

When the power-on is detected in block 201, the mobile station starts sensor driving in block 203. Here, though an embodiment of the present invention is described using an example where sensor driving starts when power-on is detected, sensor driving may start according to a specific event, and various modifications may be made based on realization.

The mobile station senses a motion input by a user via the sensor to obtain sensor data in block 205, and extracts a parameter for motion detection from the obtained sensor data in block 207.

The mobile station transmits the extracted parameter for motion detection to a counterpart mobile station in block 209, and receives a parameter for motion detection extracted by the counterpart mobile station from the counterpart mobile station in block 211. Here, the parameter for the motion detection is transmitted/received in the form of a data format illustrated in FIG. 3. The data format is described later in more detail with reference to FIG. 3.

The mobile station compares the parameters shared with the counterpart mobile station via the transmission/reception to determine a motion input by a user and performs a function associated with the determined motion in block 213. Here, a method for comparing the parameters shared with the counterpart mobile station to determine the motion input by the user is described later in more detail with reference to FIG. 4.

The mobile station ends the algorithm according to an embodiment of the present invention.

FIG. 3 illustrates a data format shared for motion determination in two mobile stations that include a motion detecting function according to an embodiment of the present invention.

Referring to FIG. 3, data shared between mobile stations for motion determination includes parameters for motion detection such as a mobile station ID 300, a motion ID 302, a time point 304 at which a motion occurs, a time duration 306 for which motion is maintained, a motion intensity 308, a motion direction 310, and such. Other parameters may be added or deleted as needed. The mobile station ID 300 serves as a unique identifier of a mobile station and is used for determining what motion is input to each mobile station. The motion ID 302 serves as an identifier of a motion input to a mobile station, indicates a motion (e.g., an impact, shake, snap, an such), and is used for determining whether the same motion is input to each mobile station. The time point 304 at which a motion occurs is used for determining whether a motion input to each mobile station occurs at the same time point. When the motion ID 302 and the time point 304 at which the motion occurs coincide in the parameters shared between the two mobile stations, each mobile station compares the time 306 for which the motion is maintained, the motion intensity 308, the motion direction 310, and such, to determine a motion input by a user. Here, the time duration 306 for which the motion is maintained is used for determining a mobile station at which a motion maintained for a longer time is input, the motion intensity 308 is used for determining a mobile station at which a motion whose intensity is stronger is input, and the motion direction 310 is used for determining the direction of a motion input at each mobile station.

Figure 4:
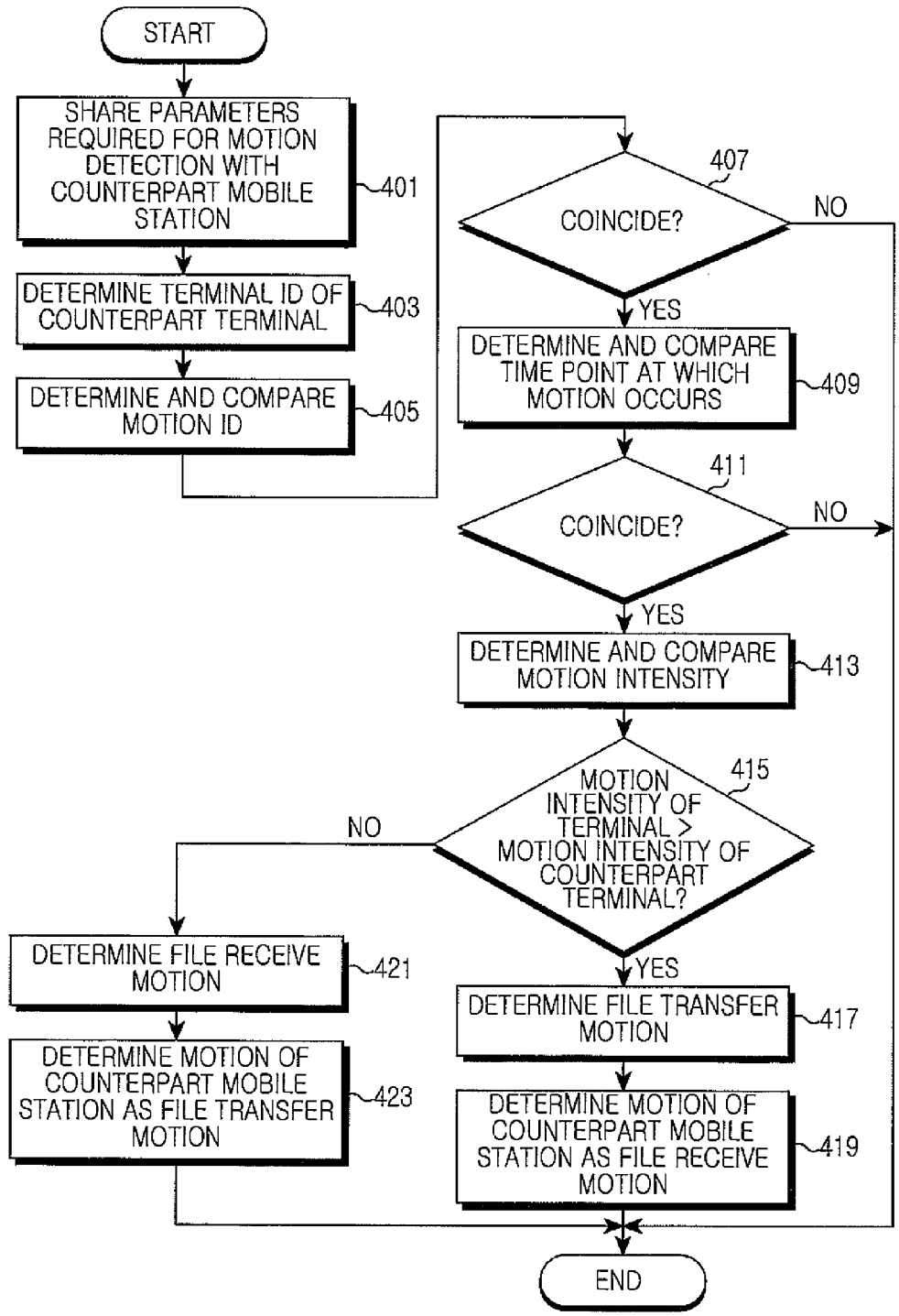
FIG. 4 illustrates a process for determining a motion input by a user by comparing parameters shared with a counterpart mobile station in two mobile stations that include a motion detecting function according to an embodiment of the present invention.

FIG. 4 illustrates a process for determining a motion input by a user by comparing parameters shared with a counterpart mobile station in two mobile stations that include a motion detecting function according to an embodiment of the present invention. Here, FIG. 4 illustrates an example of a method for determining a motion when a file transfer function is associated to two mobile stations bumping against each other and making an impact. In this situation, parameters shared by the mobile station and the counterpart mobile station include a mobile station ID, a motion ID, a time point at which a motion occurs, a motion intensity, and such.

Referring to FIG. 4, a mobile station shares parameters for motion detection with a counterpart mobile station in block 401. For example, a first mobile station transmits parameters for motion detection extracted at the first mobile stations and receives parameters for motion detection extracted by a second (counterpart) mobile station.

The mobile station determines a mobile station ID of the counterpart mobile station from the parameters for motion detection extracted by the counterpart mobile station in block 403.

The mobile station determines a motion ID from the parameters for motion detection extracted by itself and the parameters for motion detection extracted by the counterpart mobile station and compares the determined motion IDs in block 405. In block 407, the mobile station determines whether the determined motion IDs coincide.

When determining that the determined motion IDs do not coincide in block 407, the mobile station ends the process according to an embodiment of the present invention.

In contrast, when determining that the determined motion IDs coincide in block 407, the mobile station proceeds to block 409 to determine the time point at which the motion occurs from the parameters for motion detection extracted by itself and the parameters for motion detection extracted by the counterpart mobile station, and compare the determined time points at which the motion occurs. The mobile station determines whether the determined time points at which the motion occurs coincide in block 411.

When determining that the determined time points at which the motion occurs do not coincide in block 411, the mobile station ends the process according to an embodiment of the present invention.

In contrast, when determining that the determined time points at which the motion occurs coincide in block 411, the mobile station determines the mobile station and the counterpart mobile station have detected the same motion simultaneously and proceeds to block 413 to determine a motion intensity from the parameters for motion detection extracted by itself and the parameters for motion detection extracted by the counterpart mobile station, and then compare the determined motion intensities.

The mobile station determines whether the motion intensity of the mobile station is greater than that of the counterpart mobile station through the motion intensity comparison in block 415.

When determining that the motion intensity of the mobile station is greater than that of the counterpart mobile station in block 415, the mobile station determines the motion input to the mobile station by a user as a motion for file transfer in block 417, and proceeds to block 419 to determine the motion input to the counterpart mobile station by the user as a motion for file reception.

In contrast, when determining that the motion intensity of the mobile station is not greater than that of the counterpart mobile station in block 415, the mobile station determines the motion input to the mobile station by the user as a motion for file reception in block 421, and proceeds to block 423 to determine the motion input to the counterpart mobile station by the user as a motion for file transfer.

After that, the mobile station ends the process according to an embodiment of the present invention.

In an embodiment, as a parameter for motion detection shared by the mobile station and the counterpart mobile station, an ID of a relevant mobile station is transmitted. Therefore, the present invention may be utilized when two or more mobile stations exist. For example, when three or more users input a motion of shaking to a mobile station, each mobile station can know a user who shakes a mobile station many times within a shortest time, and know that the mobile station itself is an n-th mobile station that shakes many times.

Though a mobile station and a counterpart mobile station share parameters for motion detection, and each mobile station determines a motion input by a user based on the shared parameters in an embodiment of the present invention, as an alternative, the mobile station may receive the parameters for motion detection from the counterpart mobile station, determine a motion input by a user based on parameters extracted by itself and the parameters received from the counterpart mobile station, and transmit the determined result to the counterpart mobile station.

Another example is when there are two counterpart mobile stations (a second mobile station and a third mobile station). Here, the present invention is implemented in an apparatus for determining a motion via a motion detecting function in a mobile station. The apparatus comprises a motion detector for determining a parameter for motion detection from sensor data obtained via a sensor and comparing the determined parameter with a parameter received from a second mobile station and a third mobile station to determine a user's motion input, and a data receiver for receiving the parameter for motion detection determined by the second mobile station and the third mobile station from the second mobile station and the third mobile station, respectively.

The apparatus further comprises a data transmitter for transmitting the determined parameter for motion detection to the second mobile station and the third mobile station. The sensor data are acquired by using a motion detecting algorithm including one of an impact detecting algorithm, a shake detecting algorithm, and a snap detecting algorithm. The data receiver receives the parameter by using one of Bluetooth communication, a wireless Local Area Network (LAN) communication, a WIFI communication, an infrared ray communication, and an Ultra WideBand (UWB) communication. The parameter for motion detection comprises at least one of a mobile station Identifier (ID), a motion ID, a time point at which a motion occurs, a time duration for which a motion is maintained, a motion intensity, and a motion direction. Also, the data transmitter transmits the determined parameter by using one of Bluetooth communication, a wireless Local Area Network (LAN) communication, a WIFI communication, an infrared ray communication, and an Ultra WideBand (UWB) communication.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to determine a motion via a motion detecting function in a first mobile station, the method comprising:
   determining a first parameter for motion detection from sensor data obtained via a sensor, wherein the first parameter comprises a first motion intensity;
   receiving a second parameter for motion detection determined by a second mobile station from the second mobile station, wherein the second parameter comprises a second motion intensity;
   comparing the first parameter with the second parameter; and
   determining a function associated with a motion input based on the comparison of the first parameter with the second parameter.

2. The method of claim 1, further comprising transmitting the first parameter for motion detection to at least one counterpart mobile station, the at least one counterpart mobile station comprising the second mobile station.

3. The method of claim 1, wherein the sensor data is acquired by using a motion detecting algorithm including at least one of an impact detecting algorithm, a shake detecting algorithm, and a snap detecting algorithm.

4. The method of claim 1, wherein receiving the second parameter comprises using at least one of a Bluetooth communication, a wireless Local Area Network (LAN) communication, a WIFI communication, an infrared ray communication, and an Ultra WideBand (UWB) communication.

5. The method of claim 2, wherein transmitting the first parameter comprises using at least one of a Bluetooth communication, a wireless Local Area Network (LAN) communication, a WIFI communication, an infrared ray communication, and an Ultra WideBand (UWB) communication.

6. The method of claim 1, wherein each of the first parameter and the second parameter further comprises at least one of a mobile station identifier (ID), a motion ID, a time point at which a motion occurs, a time duration for which motion is maintained, and a motion direction.

7. The method of claim 6, wherein determining the function associated with the motion input comprises:
   determining whether a motion ID of the first mobile station coincides with a motion ID of the second mobile station;
   when the motion IDs coincide, determining whether a time point at which the motion occurs for the first mobile station coincides with a time point at which the motion occurs for the second mobile station;
   when the time points at which the motions occur coincide, determining whether the first motion intensity of the first mobile station is greater than the second motion intensity of the second mobile station;
   when the first motion intensity of the first mobile station is greater than the second motion intensity of the second mobile station, determining that the motion input is associated with a first function; and
   when the first motion intensity of the first mobile station is not greater than the second motion intensity of the second mobile station, determining that the motion input is associated with a second function.

8. A mobile station, comprising:
   a motion detector configured to determine a first parameter for motion detection from sensor data obtained via a sensor, compare the first parameter with a second parameter received from a counterpart station to determine a motion input of a user, wherein the first parameter comprises a first motion intensity; and
   a data receiver configured to receive the second parameter for motion detection extracted by the counterpart station, wherein the second parameter comprises a second motion intensity.

9. The mobile station of claim 8, further comprising a data transmitter configured to transmit the first parameter for motion detection to the counterpart station.

10. The mobile station of claim 8, wherein the sensor data is acquired using a motion detecting algorithm including at least one of an impact detecting algorithm, a shake detecting algorithm, and a snap detecting algorithm.

11. The mobile station of claim 8, wherein the data receiver is configured to receive the second parameter using at least one of a Bluetooth communication, a wireless Local Area Network (LAN) communication, a WIFI communication, an infrared ray communication, and an Ultra WideBand (UWB) communication.

12. The mobile station of claim 9, wherein the data transmitter is configured to transmit the first parameter using at least one of a Bluetooth communication, a wireless Local Area Network (LAN) communication, a WIFI communication, an infrared ray communication, and an Ultra WideBand (UWB) communication.

13. The mobile station of claim 8, wherein each of the first parameter and the second parameter further comprises at least one of a mobile station Identifier (ID), a motion ID, a time point at which a motion occurs, a time duration for which a motion is maintained, and a motion direction.

14. The mobile station of claim 13, wherein the motion detector is configured to determine whether a motion ID of the mobile station coincides with a motion ID of the counterpart station;

when the motion IDs coincide, the motion detector is configured to determine whether a time point at which a first motion occurs at the mobile station coincides with a time point at which a second motion occurs at the counterpart station;

when the time points at which the first motion and the second motion occur coincide, the motion detector is configured to determine whether the first motion intensity of the mobile station is greater than the second motion intensity of the counterpart station;

when the first motion intensity of the mobile station is greater than the second motion intensity of the counterpart station, the motion detector is configured to determine that the motion input is associated with a first function; and when the first motion intensity of the mobile station is not greater than the second motion intensity of the counterpart station, the motion detector is configured to determine that the motion input is associated with a second function.

15. An apparatus to determine a motion via a motion detecting function in a first mobile station, the apparatus comprising:

a motion detector configured to determine a first parameter for motion detection from sensor data obtained via a sensor, and compare the first parameter with second parameters received from a second mobile station and a third mobile station to determine a user's motion input, wherein the first parameter comprises a first motion intensity; and a data receiver configured to receive the second parameters for motion detection determined by the second mobile station and the third mobile station from the second mobile station and the third mobile station, wherein the second parameters comprise second motion intensities.

16. The apparatus of claim 15, further comprising a data transmitter configured to transmit the first parameter for motion detection to the second mobile station and the third mobile station.

17. The apparatus of claim 15, wherein the sensor data is acquired using a motion detecting algorithm including at least one of an impact detecting algorithm, a shake detecting algorithm, and a snap detecting algorithm.

18. The apparatus of claim 15, wherein the data receiver is configured to receive the second parameters using at least one of a Bluetooth communication, a wireless Local Area Network (LAN) communication, a WIFI communication, an infrared ray communication, and an Ultra WideBand (UWB) communication.

19. The apparatus of claim 15, wherein each of the first parameter and the second parameters further comprises at least one of a mobile station Identifier (ID), a motion ID, a time point at which a motion occurs, a time duration for which a motion is maintained, and a motion direction.

20. The apparatus of claim 16, wherein the data transmitter is configured to transmit the first parameter using at least one of a Bluetooth communication, a wireless Local Area Network (LAN) communication, a WIFI communication, an infrared ray communication, and an Ultra WideBand (UWB) communication.

* * * * *